(12) United States Patent
Mo

(10) Patent No.: US 9,830,148 B1
(45) Date of Patent: Nov. 28, 2017

(54) PROVIDING USER-SPECIFIC SOURCE CODE ALERT INFORMATION

(71) Applicant: SEMMLE LIMITED, Oxford (GB)

(72) Inventor: Man Yue Mo, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/418,480

(22) Filed: Jan. 27, 2017

(51) Int. Cl.
*G06F 9/44* (2006.01)

(52) U.S. Cl.
CPC . *G06F 8/71* (2013.01); *G06F 8/77* (2013.01)

(58) Field of Classification Search
CPC .......................................................... G06F 8/71
See application file for complete search history.

(56) References Cited

U.S. PATENT DOCUMENTS

| | | | |
|---|---|---|---|
| 8,464,209 B2 | 6/2013 | Marius | |
| 8,499,353 B2 | 7/2013 | Lockhart et al. | |
| 8,782,626 B2 | 7/2014 | England et al. | |
| 9,274,756 B1 * | 3/2016 | Clausen | G06F 8/33 |
| 2009/0077055 A1 * | 3/2009 | Dillon | G06F 17/30702 |
| 2010/0235351 A1 * | 9/2010 | Iwasa | G06F 17/30038 707/723 |
| 2012/0005540 A1 * | 1/2012 | England | G06F 11/3604 714/46 |
| 2012/0036492 A1 * | 2/2012 | Armstrong | G06F 8/30 717/100 |

OTHER PUBLICATIONS

Cichocki et al., "Fast local algorithms for large scale nonnegative matrix and tensor factorizations," IEICE transactions on fundamentals of electronics, communications and computer sciences 92.3: 708-721, 2009, 14 pages.

* cited by examiner

*Primary Examiner* — Hang Pan
(74) *Attorney, Agent, or Firm* — Fish & Richardson P.C.

(57) ABSTRACT

Methods, systems, and apparatus, including computer programs encoded on computer storage media, for providing user-specific source code alert information. One of the methods includes receiving a user identifier of a user that has previously accessed source code of a code base, and receiving source code access data that includes access metrics related to prior user access of the source code. Based on the source code access data and on source code that has previously been accessed by the user, relevant source code that has previously been accessed by other users is determined. Source code alerts are received for the code base, and a user-specific organization of alerts is provided for the user that identifies alerts for source code problems occurring in the source code, including at least one source code unit that has previously been accessed by another user.

17 Claims, 4 Drawing Sheets

US 9,830,148 B1

PROVIDING USER-SPECIFIC SOURCE CODE ALERT INFORMATION

BACKGROUND

This specification relates to static analysis of computer software source code.

Static analysis refers to techniques for analyzing computer software source code without executing the source code as a computer software program. Static analysis may rely on one or more characteristic metrics associated with software development projects. Using characteristics metrics, static analysis systems attempt to determine accurate and reliable conclusions about various properties of software development projects. Such conclusions may be used for a variety of purposes, including software performance optimization, software debugging, and software development cost estimation.

Static analysis can be performed on a code base, which is a collection of source code files that is typically maintained by a version control system. Version control systems generally maintain multiple revisions of the source code in the code base, each revision being referred to as a snapshot. Each snapshot is a view of the source code of files of the code base as the files existed at a particular point in time. Snapshots stored in a version control system can be represented as a directed, acyclical revision graph. Each node in the revision graph represents a commit of the source code. A commit represents a snapshot as well as other pertinent information about the snapshot such as the author of the snapshot, and data about ancestor commits of the node in the revision graph.

Characteristic metrics associated with a software development project may be derived from the computer software code associated with a software development project, from the information associated with the development of the project maintained by a project development environment, from specification documents associated with the software development project, and from external information associated with third-party interactions with the software development project.

SUMMARY

This specification describes how a system can provide a user-specific organization of source code alert information. Instead of providing information regarding all alerts for a code base, the system can prioritize the alerts in order to provide information about alerts that are likely to be relevant to a user. Users can use such information to prioritize how to address alerts in the code base. The system can generate the user-specific organization based on source code access data so that the presented alerts are relevant to the user's familiarity with certain portions of the code base.

Particular embodiments of the subject matter described in this specification can be implemented so as to realize one or more of the following advantages. A system can facilitate the discovery of and review of source code units having source code alerts that are not directly attributable to a user, yet are of potential relevance to the user. Such discovery can be based on an analysis of metadata associated with a software project's source code rather than a manual review of the source code, thus saving time and conserving network bandwidth. By generating alert data for only source code units (e.g., files, classes, and/or functions) accessed by the user, and potentially relevant source code units accessed by other users, results can be produced that the user is most interested in and in less time than required to perform a full analysis. Software development can be improved, by enabling the user to work on potentially related issues together.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes technologies for providing source code alert information that is relevant to a given user. Multiple users, e.g., source code developers, can produce the source code of a software project using various coding tools. A static analysis system can perform static analysis on the source code and can generate corresponding static analysis results. The static analysis results can include, among other things, source code alerts that indicate various potential problems identified in the source code units (e.g., files, classes, and/or functions). For brevity, a source code unit having a potential source code problem identified by an alert can be said to be a source code unit having the alert or including the alert. Similarly, an alert for a source code unit means an alert that identifies a potential source code problem occurring in the source code unit.

Developers can use the alerts to guide how to improve the source code in the project. However, the number of alerts generated for a particular project can be substantial. And, any one user may be interested in working on source code that pertains to only a portion of the software project, e.g., units under development by the user, and other related units. Manually identifying other units that are related to the units under development can be a time-intensive and challenging task for the user. By leveraging metadata associated with a software project's source code units, e.g., the commit history of the user and other users, related units that have not been worked on by the user, but have been worked on by other users who have also worked on one or more of the units under development by the user, can be readily identified. Such units, and the alerts associated with such units, may be as relevant to the user as the units under development. By enabling the user to work on units and/or alerts associated with potentially related issues together, software development can be improved. Examples are generally described below with respect to source code files, however, other types of software development units, i.e., discrete portions of a code base, such as classes or functions, may be considered instead of or in addition of files. For example, metadata associated with various source code units may be leveraged to identify related software development units that have not been worked on by the user, but have been worked on by other users who have also worked on one or more units under development by the user. Further, alerts may be identified and organized per software development unit.

Figure 1:
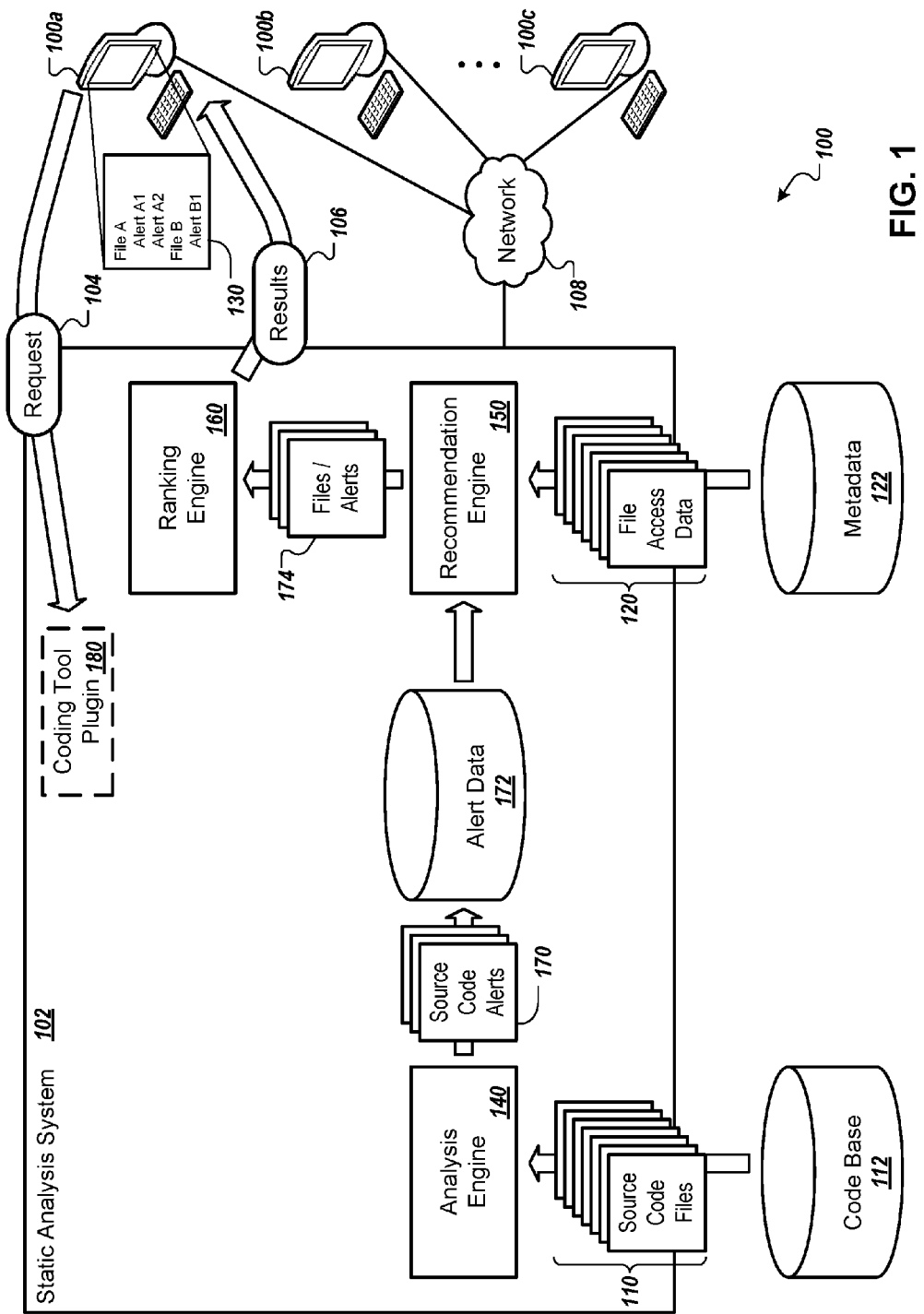
FIG. 1 illustrates an example system.

FIG. 1 illustrates an example system. A user device 100a can provide, to a static analysis system 102, a request 104 for static analysis results 106. The static analysis system 102, or portions of the static analysis system, can be installed on the user device 100a, for example, or can be installed on one or more servers in communication with the user device 100a over a communication network 108. The static analysis system 102 is an example of a static analysis system that can be implemented in a distributed, cloud-based environment for performing distributed analysis for a single project or for multiple projects. In general, the request 104 may pertain to a user request for relevant source code files and/or relevant source code alerts for a code base 112, e.g., a code base for a software project. The static analysis system 102 can perform an analysis of source code files 110 received from the code base 112 and, for each source code file, corresponding file access data 120 received from a metadata repository 122. Based on the analysis, the static analysis system 102 can automatically generate a user-specific organization of alerts that prioritizes some alerts over other alerts. For example, the system can provide a recommendation for one or more potentially relevant files to work on, one or more specific alerts, or both. The system 102 can also rank the files, the alerts, or both. The system 102 can then include the recommendation in the static analysis results 106, including information associated with the files and/or alerts. In response to receiving the static analysis results 106, for example, the user device 100a can update an interface 130 presented by a device display to include the recommendation included in the results 106, e.g., as a ranked list of potentially relevant files and/or alerts.

The static analysis system 102 can include several different functional components, including an analysis engine 140, a recommendation engine 150, and a ranking engine 160. The various functional components of the static analysis system 102 may be installed on one or more computers as separate functional components or as different modules of a same functional component. For example, the components 140, 150, and 160 of the static analysis system 102 can be implemented as computer programs installed on one or more computers in one or more locations that are coupled to each through a network. In cloud-based systems for example, these components can be implemented by individual computing nodes of a distributed computing system.

In general, the code base 112 can include a collection of all source code files used to build a particular software system, application, or component. The code base 112 can be stored in a source control repository included in a revision control system, for example, and/or can be stored as a set of files.

The analysis engine 140 can analyze the source code files 110 received by the static analysis system 102 from the code base 112, can generate source code alerts 170 based on the analysis, and can maintain the source code alerts 170 as alert data 172, e.g., in a repository and/or in memory. The alert data 172 can include information that specifies potential source code problems identified by the analysis engine 140. Potential problems indicated by alerts can include, for example, a wrong number of arguments in function calls, incompatible type operations, and duplicated code segments. Potential problems indicated by alerts can also include coding defects that violate one or more coding standards or rules. Data representing such coding defects will be referred to as violations. Thus, an alert can indicate a violation that identifies a location in a source code file of a coding defect, a type of or message describing the coding defect, and the segment of source code that causes the coding defect. For example, a segment of source code that compares variables of incomparable types is a coding defect, which can be represented by a corresponding violation that identifies the location of the source code, the source code itself, and a type of "comparison between variables of incomparable types," which can be indicated by a corresponding alert. Suitable techniques for identifying violations and attributing violation status changes to responsible entities are described in more detail in commonly-owned U.S. patent application Ser. No. 14/696,185, entitled "Source Code Violation Matching and Attribution," which is incorporated herein by reference.

The static analysis system 102 can generate alert data 172 in response to one or more trigger events. In some implementations, the system 102 can perform a full or partial analysis of source code files in response to an explicit request for static analysis results. For example, the user device 100a can provide the request 104 for static analysis results 106.

In some implementations, the system 102 can perform a full or partial analysis in response to a particular file being accessed and/or modified. For example, the static analysis system 102 can receive and analyze the accessed and/or modified source code file, and can update any resulting source code alerts 170 as alert data 172.

In some implementations, the system 102 can periodically (e.g., hourly, nightly) perform full analysis of a code base. For example, the static analysis system 102 can receive all source code files 110 of the code base 112 on a periodic basis, can analyze the source code files, and can maintain any resulting source code alerts 170 as alert data 172.

The recommendation engine 150 can receive the alert data 172 generated by the analysis engine, and file access data 120 provided by the metadata repository 122, and can determine relevant source code files and/or alerts 174. Optionally, the ranking engine 160 can rank the source code files and/or alerts 174, and can provide one or more ranked lists within the results 106. Various ranking schemes will be discussed in more detail below.

The static analysis system 102 can include a coding tool plugin 180. The coding tool plugin 180 is a software application or module that extends the capabilities of other coding tools by allowing the results 106 generated by the static analysis system 102 to be integrated into the other coding tools. The implementation of the coding tool plugin 180 will depend on the particular coding tool being extended. For simplicity, only one coding tool plugin 180 is shown. However, the system 102 may include multiple coding tool plugins to support a variety of applications. The static analysis system 102, for example, can receive requests for relevant source code files and/or source code alerts, e.g., the request 104, and can provide information associated with the relevant source code files and/or source code alerts, e.g., the results 106, through the coding tool plugin 180.

An example of a coding tool that can make use of the coding tool plugin 180 is an integrated development environment (IDE). An IDE is an application, or a suite of applications, that facilitates developing source code on a single user device through a graphical user interface. An IDE usually has applications including a source code editor, a compiler, and a debugger. IDEs often also have a file browser as well as object and class browsers. IDEs are designed to be interactive and responsive. Thus, performing a full analysis of all source code files in the code base 112 is generally too time consuming for IDE applications. An IDE can use the coding tool plugin 180 to perform a partial analysis of source code files, e.g., including only relevant source code files, and to present relevant source code alert information within the development environment. For example, a user can request relevant static analysis results 106 by selecting an option, e.g., a button, from within the IDE. The coding tool plugin 180 can then automatically identify relevant source code files and/or source code alerts. The IDE can then display the results 106 within the IDE.

Another example of a coding tool that can make use of the coding tool plugin 180 is a code review tool. A code review tool is any appropriate software application, or suite of software applications, that developers can use to facilitate review of source code files that are the subject of previous or proposed commits or changes to the source code base. Performing static analysis on all source code files in the code base 112 is time consuming and most of the results would not be relevant to the source code files under review. A code review tool can use the coding tool plugin 180 to perform a partial analysis of source code files, e.g., including only relevant source code files, and to present relevant source code alert information for source code that is part of a code review. For example, a user can select, within a code review tool, source code files that are part of a proposed commit to the source code base. The coding tool plugin 112 can then automatically select potentially relevant source code files, in addition to the user-selected files, to be the subject of a code review whose analysis results 106 are to be presented as part of the code review tool. The coding tool plugin 180 can then provide the resulting analysis results 106 to the code review tool for presentation to the user.

The aforementioned coding tools illustrate common situations where providing source code alert information is beneficial. In addition, other appropriate coding tools can also use a corresponding coding tool plugin 180 to integrate the analysis results 106 generated by the static analysis system 102 for a particular application.

Figure 2:
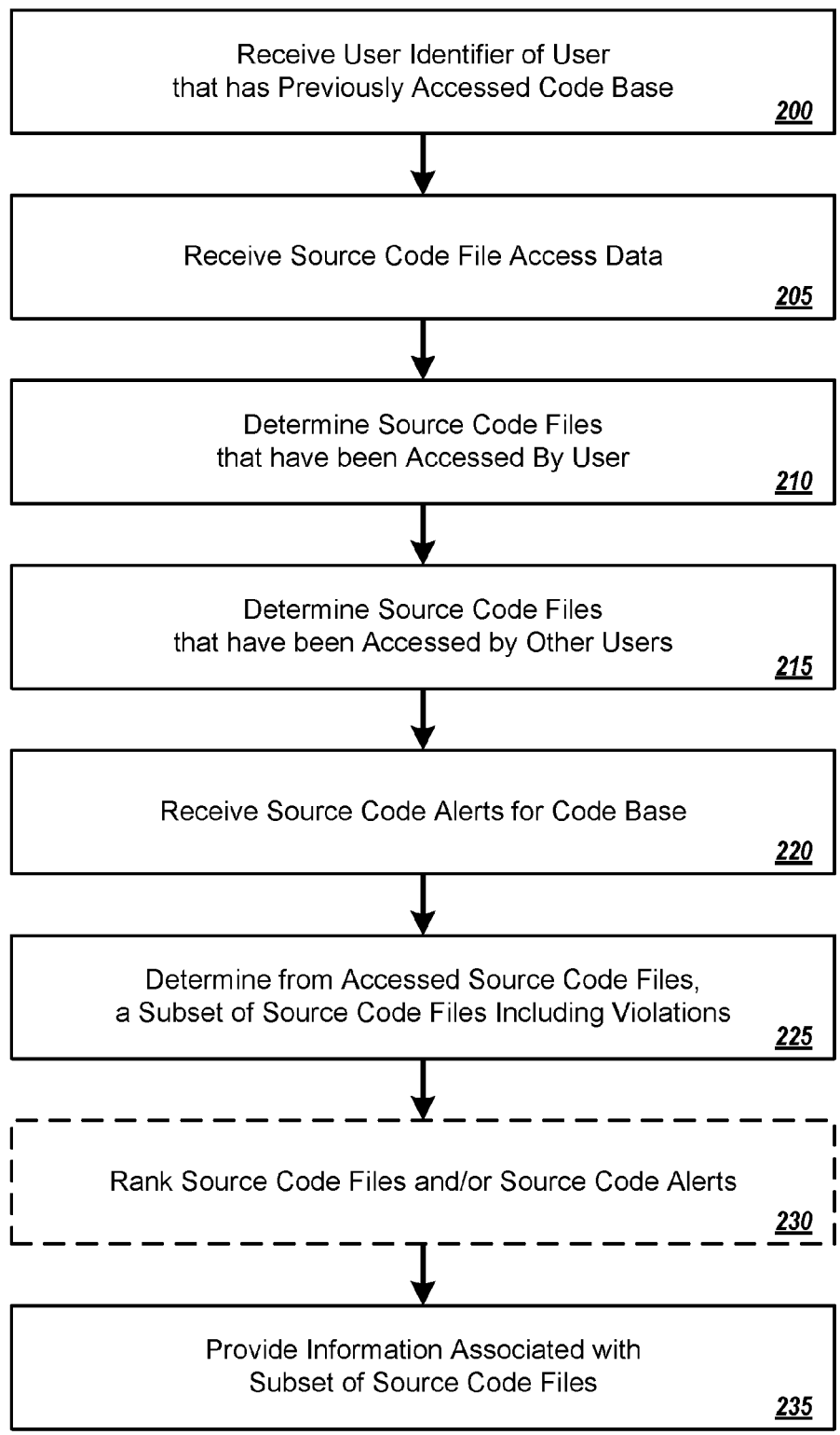
FIG. 2 is a flow chart of an example process for providing a user-specific organization of alerts.

FIG. 2 is a flow chart of an example process for providing a user-specific organization of alerts. The process will be described as being performed by an appropriately programmed system of one or more computers, e.g., the example static analysis system 102, shown in FIG. 1.

The process may begin in response to a request for static analysis results. In some implementations, the request for static analysis results can include a request for relevant source code files and/or alerts for a given user. For example, the user can interact with the interface 130 presented by the user device 100a, e.g., by selecting an option, to provide the request 104. As another example, the request 104 can automatically be provided by application software executed by the user device 100a or another suitable computing device or system.

The system receives a user identifier of a user that has previously accessed at least one source code file of the code base (200). For example, the static analysis system 102 can receive the request 104, e.g., through the coding tool plugin 180. The request 104, for example, can include an identifier of a user of the user device 100a, the user having previously accessed, e.g., viewed, modified, created, one or more source code files of the code base 112. The user of the user device 100a, for example, may be a software developer that works on developing source code of a particular software system, application, or component, along with other users, e.g., users of the user devices 100b and 100c.

The system receives source code file access data (205). For example, the static analysis system 102 can receive the file access data 120 from the metadata repository 122. The source code file access data 120, for example, can include file access metrics related to prior user access of source code files 110 of the code base 112. For example, each source code file of the source code files 110 can be associated with a corresponding collection of file access data 120 that includes file access metrics for each of the users who have accessed the source code file. The file access metrics for each source code file can include various statistics for each respective user who has accessed the file, e.g., a number of times the user accessed the file, a measure of churn the user contributed to the file, a number of times that the user committed revisions to the file to the code base, timestamps for file access events, and other appropriate statistics. The measure of churn can include a sum of added lines of code, deleted lines of code, and modified lines of code attributed to the user to the file.

Figure 3:
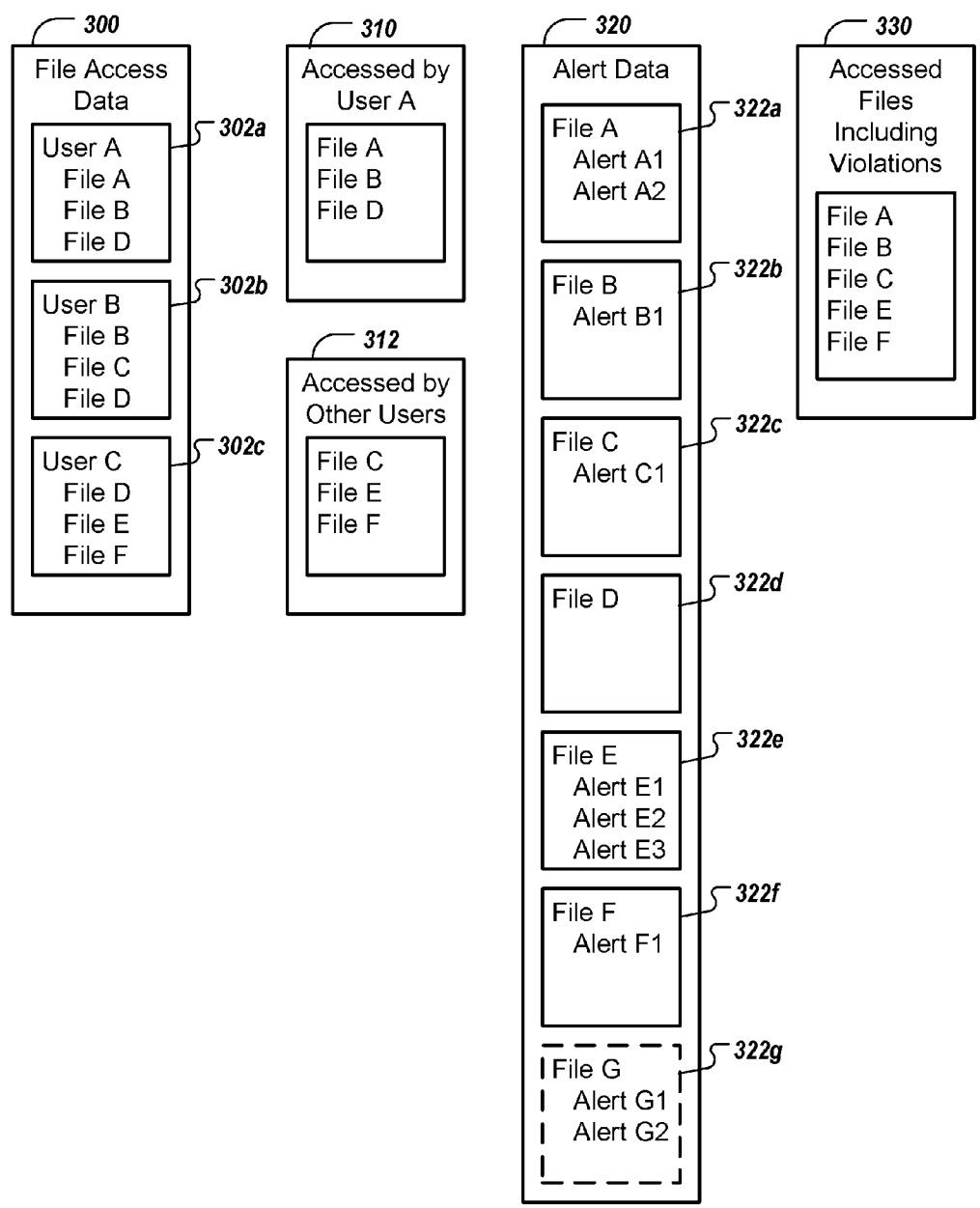
FIG. 3 illustrates example file access data and example alert data.

Referring now to FIG. 3, example file access data is illustrated. In the present example, file access data 300, e.g., similar to the file access data 120 (shown in FIG. 1), includes file access metrics 302a for User A, file access metrics 302b for User B, and file access metrics 302c for User C. User A, for example, can be a user of the user device 100a (shown in FIG. 1), User B can be a user of the user device 100b, and User C can be a user of the user device 100c. As shown in the present example, User A has previously accessed, e.g., viewed, modified, and/or created, Files A, B, and D, User B has previously accessed Files B, C, and D, and User C has previously accessed Files D, E, and F.

Based on the source code file access data and the user identifier, the system determines a first set of source code files that have previously been accessed by the user (210). For example, the static analysis system 102 (shown in FIG. 1) can use an identifier of User A to query the file access data 300, and to identify one or more source code files that have been accessed by User A. In the present example, based on the file access data 300 including the file access metrics 302a for User A, a first set of source code files 310 that have previously been accessed by User A, including Files A, B, and D, can be determined.

Based on the source code file access data and the first set of source code files that have previously been accessed by the user, the system determines a second set of source code files that have previously been accessed by other users who have also accessed at least one source code file from the first set of source code files (215). To determine the second set of source code files 312 that have previously been accessed by other users who have also accessed at least one source code from the first set of source code files 310, for example, the static analysis system 102 (shown in FIG. 1) can use the recommendation engine 150 to perform various data analysis techniques, such as collaborative filtering, non-negative matrix factorization, or other suitable data analysis techniques. In the present example, file identifiers of each of the files in the first set of source code files 310 can be used to query the file access data 300, and to identify one or more other users who have also accessed the file. For example, File A had not been accessed by other users in addition to User A, whereas File B had also been accessed by User B, and File D had also been accessed by User B and User C. After identifying other users who have also accessed at least one source code file from the first set of source code files 310, for example, the static analysis system 102 can use user identifiers of the other users, e.g., User B and User C, to query the file access data 300, and to identify one or more additional files that have been accessed by the other users but have not been accessed by User A. In addition to File B and File D, accessed by both User A and User B, for example, User B has accessed File C. In addition to File D, accessed by both User A and User C, for example, User C has accessed File E and File F. Thus, in the present example, Files C, E, and F can be included in the second set of source code files 312.

In some implementations, relevance scores can be determined for each pair of file and user, where a higher score indicates that the file is more relevant to the user. For example, the recommendation engine 150 can access the file access data 300, and can assign a relevance score, e.g., based on recommender system algorithms such as collaborative filtering and matrix factorization, for each of the files A, B, C, D, E, F, and G, with respect to each of the users A, B, and C. The basis of the relevance score is generally determined by identifying files that have been accessed by the user and identifying other users that have accessed the same file, however, file relevance may also be determined for files that are several steps removed from a given user. For example, if User A accessed File A, User B accessed files A and B, and User C accessed files B and C, then File C may also have relevance to User A, but generally less relevance than that of files A and B. In general, all file/user pairs can have a corresponding score, and for each user, the score can be used to rank the relevance of files to user. The first set of source code files 310 and the second set of source code files 312, for example, can include files that each have a corresponding relevance score that meets a threshold value.

The system receives a plurality of source code alerts for a code base (220). For example, the static analysis system 102 (shown in FIG. 1) can use file identifiers of files in the first set of source code files 310 and file identifiers of files in the second set of source code files 312, to query the code base 112 and to identify the files. The static analysis system 102 can receive the identified source code files 110 and can use the analysis engine 140, for example, to perform static analysis of the received source code files. The received source code files 110, for example, can include a portion of all files of the code base 112, including source code files accessed by User A and potentially relevant source code files accessed by other users. Based on the analysis, for example, the analysis engine 140 can generate source code alerts 170, maintained as alert data 172, e.g., in a repository and/or in memory. Each source code alert can indicate one or more potential source code problems, e.g., a source code violation, in a respective source code file 110 of the code base 112. Generally, the first set of source code files 310 and the second set of source code files 312 will include a small portion of the source code files of the code base 112. By performing a partial analysis and generating alert data for only the first and second sets of source code files, i.e., source code files accessed by the user, and potentially relevant source code files accessed by other users, results can be produced that the user is most interested in and in only a fraction of the time required to perform a full analysis.

Referring again to FIG. 3, example alert data is illustrated. In the present example, alert data 320, e.g., similar to the alert data 172 (shown in FIG. 1), includes alert data 322*a* for File A, alert data 322*b* for File B, alert data 322*c* for File C, alert data 322*d* for File D, alert data 322*e* for File E, and alert data 322*f* for File F. Optionally, the alert data 320 may include alert data for source code files of the code base 112 not included in the first set of source code files 310 or the second set of source code files 312. For example, alert data 322*g* for File G may have been previously generated in response to the file being accessed and/or modified, or as part of a full analysis of source code files of the code base 112. In the present example, alert data 322*a* for File A includes Alerts A1 and A2, alert data 322*b* for File B includes Alert B1, alert data 322*c* for File C includes Alert C1, alert data 322*d* for File D includes no alerts, alert data 322*e* for File E includes Alerts E1, E2, and E3, alert data 322*f* for File F includes Alert F1, and alert data 322*g* for File G includes Alerts G1 and G2.

The system determines, from the first and second sets of source code files, a third set of source code files that include at least one alert indicated by the received plurality of source code alerts for the code base (225). For example, the static analysis system 102 (shown in FIG. 1) can use the recommendation engine 150 to determine a set of accessed files 330 that include alerts, from the first set of source code files 310, e.g., files accessed by User A, from the second set of source code files 312, e.g., files accessed by other users, and from the alert data 320. In the present example, the set of accessed files 330 that include alerts includes File A, as indicated by Alerts A1 and A2, File B, as indicated by Alert B1, File C, as indicated by Alert C1, File E, as indicated by Alerts E1, E2, and E3, and File F, as indicated by Alert F1. File D, for example, can be excluded from the third set of accessed files 330 that include alerts, as the alert data 322*d* for File D includes no alerts.

In some implementations, the system can identify a set of received source code alerts that are associated with the set of source code files. For example, the static analysis system 102 (shown in FIG. 1) can use the recommendation engine 150 to identify Alerts A1 and A2 for accessed File A, Alert B1 for accessed File B, Alert C1 for accessed File C, Alerts E1, E2, and E3 for accessed file E, and Alert F1 for accessed File F. In the present example, Alerts G1 and G2 for File G can be excluded, as File G is not included in the set of accessed files 330 that include alerts.

Figure 4:
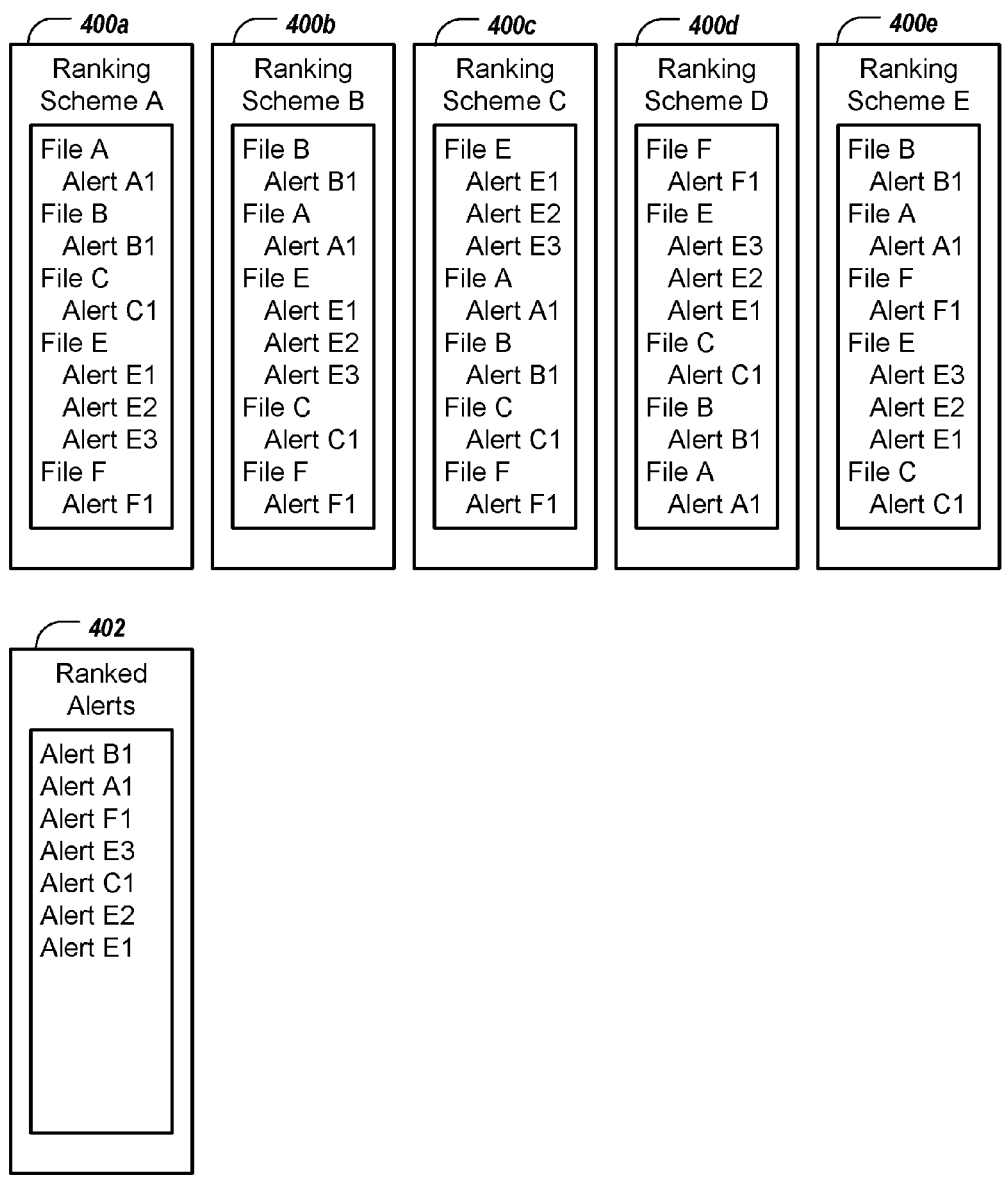
FIG. 4 illustrates example ranking schemes for file and alert data.

In some implementations, the system can rank the third set of source code files and/or the set of source code alerts (230). For example, the static analysis system 102 (shown in FIG. 1) can use the ranking engine 160 to rank files and/or alerts provided by the recommendation engine 150. Ranking schemes can be implemented using the alert data 172 and/or file access data 120 from the metadata repository 122, and can be based on a single factor or on a combination of factors. For example, ranking source code files can include determining a relevance score for each file based on one or more factors, and ranking the files according to the determined score. Referring now to FIG. 4, example ranking schemes for file and alert data are illustrated.

In some implementations, each source code file of the third set of source code files can be ranked based at least in part on whether the source code file belongs to the first set of source code files or the second set of source code files. For example, the ranking engine 160 can analyze the first set of source code files 310, e.g., files accessed by User A, and the second set of source code files 312, e.g., files accessed by other users, when ranking the set of accessed files 330 that include alerts (shown in FIG. 3). As illustrated by example ranking scheme 400*a* (shown in FIG. 4), files that were accessed by User A (e.g., Files A and B) and/or alerts associated with the files, can be ranked higher than files that were accessed by other users (e.g., Files C, E, and F) and/or alerts associated with those files.

In some implementations, each source code file of the third set of source code files can be ranked based at least in part on file access metrics associated with the source code file. For example, the ranking engine 160 can analyze the file access data 300 when ranking the set of accessed files 330 that include alerts (shown in FIG. 3). Based on the file access data 300, for example, the files 330 can be ranked such that files associated with a higher level of access activity, e.g., a higher number of file access events, a higher churn indicator, a higher number of commits, more recent commits, or another suitable factor, are ranked higher than files associated with a lower level of access activity. As illustrated by example ranking scheme 400*b* (shown in FIG. 4), of the files that were accessed by user A, File B and its associated alerts are ranked higher than File A and its associated alerts, based on file access metrics. Similarly, based on file access metrics, of the files that were accessed by other users, Files E, C, and F are ranked in respective order.

In some implementations, each source code file of the third set of source code files can be ranked based at least in part on a number of alerts associated with the source code file. For example, the ranking engine 160 can analyze the alert data 320 when ranking the set of accessed files 330 that include alerts (shown in FIG. 3). Based on the alert data 320, for example, the files 330 can be ranked such that files that are associated with more alerts are ranked higher than files that are associated with fewer alerts. As illustrated by example ranking scheme 400*c* (shown in FIG. 4), File E having Alerts E1, E2, and E3, is ranked higher than Files A, B, C, and F, each file having a single alert.

In some implementations, each source code file of the third set of source code files can be ranked based at least in part on an importance of alerts associated with the source code file. For example, the ranking engine 160 can analyze the alert data 320 when ranking the set of accessed files 330 that include alerts (shown in FIG. 3). Based on the alert data 320, for example, the files 330 can be ranked such that files that are associated with more important alerts, e.g., alerts having a critical status, are ranked higher than files that are associated with less important alerts, e.g., alerts having a non-critical status. As illustrated by example ranking scheme 400*d* (shown in FIG. 4), File F being associated with Alert F1 having a critical status, is ranked highest. Continuing the example, File E being associated with multiple alerts E3, E2, and E1 of non-critical status, is ranked next, based on an aggregate, e.g., cumulative or average importance of its alerts, and the alerts are themselves ranked in order of importance. Continuing the example, Files C, B, and A, each being associated with a single alert, are ranked in order of importance of their alerts.

In some implementations, two or more ranking schemes may be combined, and values associated with various ranking factors may be weighted to implement a mixed ranking scheme. For example, the ranking engine 160 can analyze the file access data 300 and the alert data 320 when ranking the set of accessed files 330 that include alerts (shown in FIG. 3). Based on the file access data 300 and the alert data 320, for example, the various ranking schemes 400*a-d* can be combined such that a first factor has a first weight, a second factor has a second weight, and so forth. As illustrated by example ranking scheme 400*e* (shown in FIG. 4), each file is associated with a first value based on whether the file has been accessed by a given user or by other users, is associated with a second value that is proportional to a level of access activity associated with the file, is associated with a third value that is proportional to a number of alerts associated with the file, and is associated with a fourth value that is proportional to an importance of alerts associated with the file. A respective weight can be applied to each value to determine a composite relevance score for the file, and each file can be ranked according to the score. Weight values can be modified, e.g., by a system administrator, based on preferences according to the static analysis system 102, the code base 112, or both.

The system provides information associated with the third set of source code files (235). For example, the static analysis system 102 (shown in FIG. 1) can provide static analysis results 106 associated with the source code files and/or alerts 174, such as the set of accessed files 330 that include alerts (shown in FIG. 3). In some implementations, the system can provide a ranked list of the third set of source code files. For example, the static analysis system 102 can optionally use the ranking engine 160 to rank the source code files and/or alerts 174, prior to providing static analysis results 106.

In some implementations, providing information associated with the third set of source code files can include providing the third set of source code files and/or the set of source code alerts for display to the user. For example, the static analysis system 102 can provide the static analysis results 106 including information associated with the source code files and/or alerts 174 to the user device 100*a*, e.g., through the coding tool plugin 180. The third set of source code files can be provided as a ranked list, for example, according to any of the ranking schemes 400*a-e*. As another example, a set of ranked alerts, e.g., ranked alerts 402 based on ranking scheme 400*e*, can be provided as a ranked list. After receiving the static analysis results 106, for example, the user device 100*a* can update the interface 130 to include information associated with potentially relevant files and/or alerts.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached embodiments and the embodiments described above, the following embodiments are also innovative:

Embodiment 1 is a method comprising:

receiving a user identifier of a user that has previously accessed at least one source code unit of a code base;

receiving source code access data that includes access metrics related to prior user access of source code units of the code base;

based on the source code access data and the user identifier, determining a first set of source code units that have previously been accessed by the user;

based on the source code access data and the first set of source code units that have previously been accessed by the user, determining a second set of source code units that have previously been accessed by other users who have also accessed at least one source code unit accessed by the user;

receiving a plurality of source code alerts for the code base, each source code alert indicating a potential source code problem in a respective source code unit of the code base; and providing a user-specific organization of alerts for the user identifying one or more alerts for source code problems occurring in at least one of the second set of source code units.

Embodiment 2 is the method of embodiment 1, wherein providing the user-specific organization of alerts comprises:

determining, from the first and second sets of source code units, a third set of source code units that each include at least one alert of the received plurality of source code alerts for the code base;

ranking source code units of the third set of source code units; and providing a ranked list of the third set of source code units.

Embodiment 3 is the method of embodiment 2, wherein each source code unit of the third set of source code units is ranked based at least in part on an importance of alerts associated with the source code unit.

Embodiment 4 is the method of any one of embodiments 2-3, wherein each source code unit of the third set of source code units is ranked based at least in part on a number of alerts associated with the source code unit.

Embodiment 5 is the method of any one of embodiments 2-4, wherein each source code unit of the third set of source code units is ranked based at least in part on access metrics associated with the source code unit.

Embodiment 6 is the method of any one of embodiments 2-5, wherein each source code unit of the third set of source code units is ranked based at least in part on whether the source code unit belongs to the first set of source code units or the second set of source code units.

Embodiment 7 is the method of any one of embodiments 2-6, further comprising:

determining, for each source code unit of the third set of source code units, a relevance score, wherein a given source code unit is included in the ranked list of the third set of source code units in response to determining that its respective relevance score meets a threshold value.

Embodiment 8 is the method of any one of embodiments 2-7, further comprising:

identifying a set of the received source code alerts that are associated with the third set of source code units;

wherein providing the user-specific organization of alerts includes providing the set of source code alerts for display to the user.

Embodiment 9 is the method of embodiment 8, further comprising:

ranking the set of source code alerts;

wherein the set of source code alerts are provided for display to the user as a ranked list of the set of source code alerts.

Embodiment 10 is the method of any one of embodiments 2-7, further comprising receiving a request for relevant source code units from the user.

Embodiment 11 is the method of any one of embodiments 2-9, further comprising receiving a request for relevant source code alerts from the user.

Embodiment 12 is the method of any one of embodiments 1-11, wherein the access metrics includes, for a given source code unit, a number of file access events for each respective user.

Embodiment 13 is the method of any one of embodiments 1-12, wherein the access metrics includes, for a given source code unit, a churn indicator value for each respective user.

Embodiment 14 is the method of any one of embodiments 1-13, wherein the access metrics includes, for a given source code unit, a number of commits for each respective user.

Embodiment 15 is a system comprising: one or more computers and one or more storage devices storing instructions that are operable, when executed by the one or more computers, to cause the one or more computers to perform the method of any one of embodiments 1 to 14.

Embodiment 16 is a computer storage medium encoded with a computer program, the program comprising instructions that are operable, when executed by data processing apparatus, to cause the data processing apparatus to perform the method of any one of embodiments 1 to 14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:

receiving a request for static analysis results relevant to a first user who has previously accessed at least one source code unit of a code base, the code base including a plurality of source code units;

receiving source code access data, the source code access data including, for each source code unit of the code base and for each user who has previously accessed the source code unit, a record of one or more prior accesses of the source code unit by the user;

determining from the source code access data a first set of source code units that have previously been accessed by the first user, wherein the first set of source code units includes source code files that are part of a proposed commit to the code base;

determining from the source code access data a second set of source code units that are not in the first set of source code units and that have previously been accessed by one or more other users other than the first user who have also accessed at least one source code unit in the first set of source code units;

generating a plurality of source code alerts by analyzing a subset of the code base that includes the source code units in the first and second sets of source code units, each source code alert being associated with a respective source code unit and indicating a potential source code problem in the respective source code unit of the code base; and providing, as static analysis results that are relevant to the first user, source code alert information that describes source code problems occurring in at least one of the second set of source code units, wherein providing the source code alert information comprises:

determining, from the first and second sets of source code units and the plurality of source code alerts, a third set of source code units, wherein the third set of source code units includes one or more source code units in the first and second sets of source code units associated with at least one source code alert in the plurality of source code alerts;

ranking source code units of the third set of source code units; and providing a ranked list of the third set of source code units.

2. The computer-implemented method of claim 1, wherein each source code unit of the third set of source code units is ranked based at least in part on an importance of alerts associated with the source code unit, such that a first source code unit that is associated with a more important alert is ranked higher than a second source code unit that is only associated with a less important alert.

3. The computer-implemented method of claim 1, wherein each source code unit of the third set of source code units is ranked based at least in part on a number of alerts associated with the source code unit, such that a first source code unit that is associated with more alerts is ranked higher than a second source code unit that is associated with fewer alerts.

4. The computer-implemented method of claim 1, wherein each source code unit of the third set of source code units is ranked based at least in part on an amount of access activity associated with the source code unit, such that a first source code unit that is associated with a higher level of access activity is ranked higher than a second source code unit that is associated with a lower level of access activity.

5. The computer-implemented method of claim 1, wherein each source code unit of the third set of source code units is ranked based at least in part on whether the source code unit belongs to the first set of source code units or the second set of source code units, such that a first source code unit that belongs to the first set of source code units is ranked higher than a second source code unit that belongs to the second set of source code units.

6. The computer-implemented method of claim 1, further comprising:

determining, for each source code unit of the third set of source code units, a relevance score, wherein a given source code unit is included in or not included in the ranked list of the third set of source code units based on whether its respective relevance score meets a threshold value.

7. The computer-implemented method of claim 1, further comprising:

identifying a set of source code alerts that are associated with the third set of source code units;

wherein providing source code alert information includes providing information about the set of source code alerts for display to the first user.

8. The computer-implemented method of claim 7, further comprising:

ranking the set of source code alerts;

wherein the set of source code alerts are provided for display to the user as a ranked list of the set of source code alerts.

9. The computer-implemented method of claim 1, wherein the record of one or more prior accesses of the source code unit includes, for a given source code unit, a churn indicator value for each respective user who has previously accessed the given source code unit, wherein the churn indicator value is proportional to a number of lines of code in the given source code unit that has been modified by the respective user.

10. The computer-implemented method of claim 1, wherein:

the record of one or more prior accesses of the source unit includes, for a given source code unit, a number of commits for each respective user; and the one or more other users are each users who have made a commit to any of the source code units in the first set of source code units.

11. The computer-implemented method of claim 1, wherein generating the plurality of source code alerts for the code base includes analyzing only source code units in the first and second sets of source code units.

12. A system comprising:

one or more computers and one or more storage devices storing instructions that are operable, when executed by the one or more computers, to cause the one or more computers to perform operations comprising:

receiving a request for static analysis results relevant to a first user who has previously accessed at least one source code unit of a code base, the code base including a plurality of source code units;

receiving source code access data, the source code access data including, for each source code unit of the code base and for each user who has previously accessed the source code unit, a record of one or more prior accesses of the source code unit by the user;

determining from the source code access data a first set of source code units that have previously been accessed by the first user, wherein the first set of source code units includes source code files that are part of a proposed commit to the code base;

determining from the source code access data a second set of source code units that are not in the first set of source code units and that have previously been accessed by one or more other users other than the first user who have also accessed at least one source code unit in the first set of source code units;

generating a plurality of source code alerts by analyzing a subset of the code base that includes the source code units in the first and second sets of source code units, each source code alert being associated with a respective source code unit and indicating a potential source code problem in the respective source code unit of the code base; and providing, as static analysis results that are relevant to the first user, source code alert information that describes source code problems occurring in at least one of the second set of source code units, wherein providing the source code alert information comprises:

determining, from the first and second sets of source code units and the plurality of source code alerts, a third set of source code units, wherein the third set of source code units includes one or more source code units in the first and second sets of source code units associated with at least one source code alert in the plurality of source code alerts;

ranking source code units of the third set of source code units; and providing a ranked list of the third set of source code units.

13. The system of claim 12, the operations further comprising:

identifying a set of source code alerts that are associated with the third set of source code units;

wherein providing source code alert information includes providing information about the set of source code alerts for display to the first user.

14. The system of claim 12, wherein generating the plurality of source code alerts for the code base includes analyzing only source code units in the first and second sets of source code units.

15. A computer program product, encoded on one or more non-transitory computer storage media, comprising instructions that when executed by one or more computers cause the one or more computers to perform operations comprising:

receiving a request for static analysis results relevant to a first user who has previously accessed at least one source code unit of a code base, the code base including a plurality of source code units;

receiving source code access data, the source code access data including, for each source code unit of the code base and for each user who has previously accessed the source code unit, a record of one or more prior accesses of the source code unit by the user;

determining from the source code access data a first set of source code units that have previously been accessed by the first user, wherein the first set of source code units includes source code files that are part of a proposed commit to the code base;

determining from the source code access data a second set of source code units that are not in the first set of source code units and that have previously been accessed by one or more other users other than the first user who have also accessed at least one source code unit in the first set of source code units;

generating a plurality of source code alerts by analyzing a subset of the code base that includes the source code units in the first and second sets of source code units, each source code alert being associated with a respective source code unit and indicating a potential source code problem in the respective source code unit of the code base; and providing, as static analysis results that are relevant to the first user, source code alert information that describes source code problems occurring in at least one of the second set of source code units, wherein providing source code alert information comprises:

determining, from the first and second sets of source code units and the plurality of source code alerts, a third set of source code units, wherein the third set of source code units includes one or more source code units in the first and second sets of source code units associated with at least one source code alert in the plurality of source code alerts;

ranking source code units of the third set of source code units; and providing a ranked list of the third set of source code units.

16. The computer program product of claim 15, the operations further comprising:

identifying a set of source code alerts that are associated with the third set of source code units;

wherein providing source code alert information includes providing information about the set of source code alerts for display to the first user.

17. The computer program product of claim 15, wherein generating the plurality of source code alerts for the code base includes analyzing only source code units in the first and second sets of source code units.

* * * * *